UNITED STATES PATENT OFFICE.

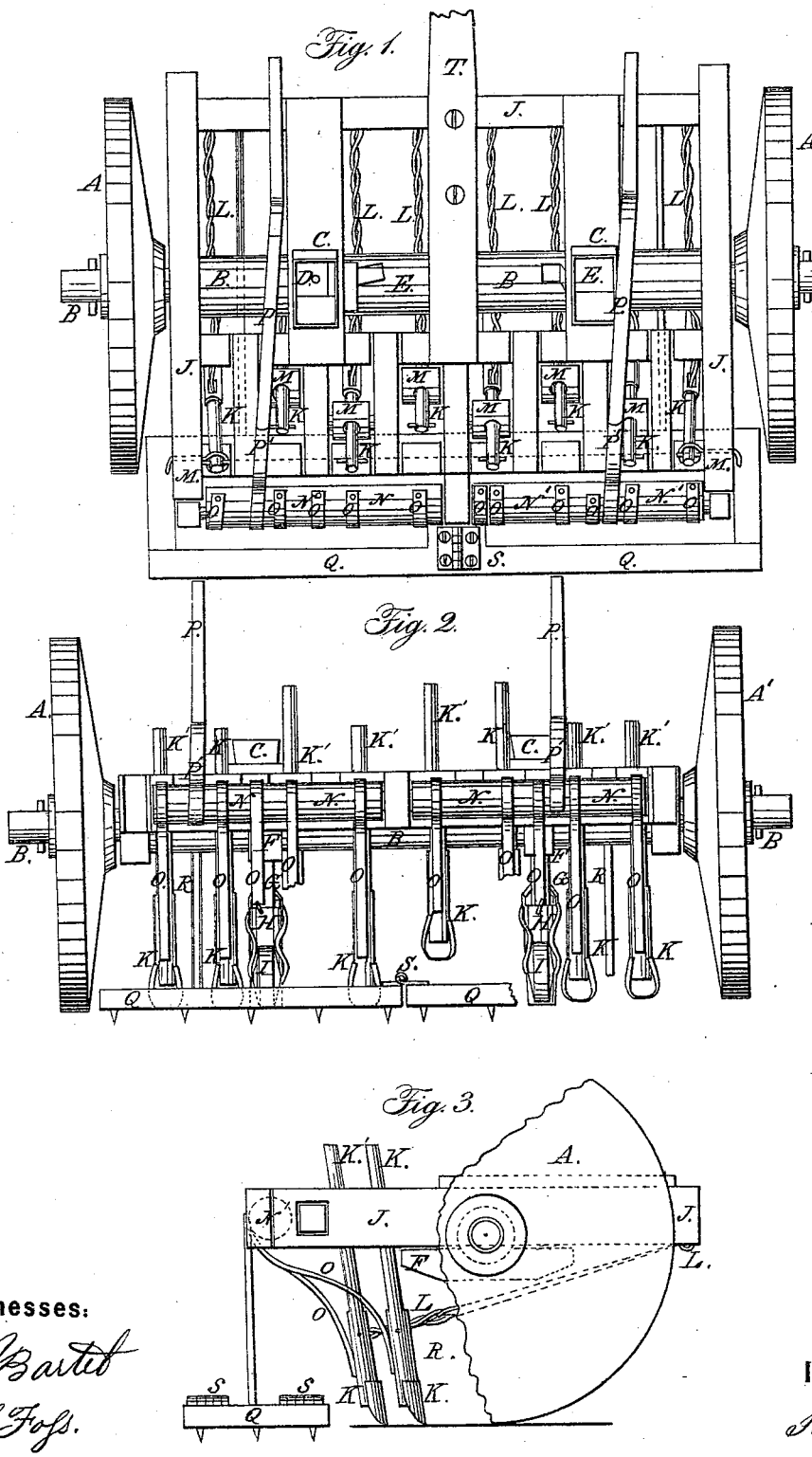

JACOB MAIZE, OF WOOSTER, OHIO.

IMPROVEMENT IN SEEDING-MACHINES.

Specification forming part of Letters Patent No. 25,430, dated September 13, 1859.

*To all whom it may concern:*

Be it known that I, JACOB MAIZE, of Wooster, in the county of Wayne and State of Ohio, have invented certain new and useful Improvements in a Combined Seeding-Machine, Cultivator, and Harrow; and I do hereby declare that the following is a full, clear, and exact description of the same, reference being had to the annexed drawings, making part of this specification, in which—

Figure 1 is a plan view; Fig. 2, a rear view; Fig. 3, a side view.

Like letters denote like parts in the several views.

The machine is mounted upon the two wheels A A', which are connected to the axle B. The wheel A is fastened to the axle, while the wheel A' is loose upon it. The axle is for the double purpose of a seed-roller and axle combined. In this axle, directly under the hoppers or seed-boxes C C, Figs. 1, 2, are sunk a series of cups, D, extending around the axle. Between the seed-cups in the axle and seed-boxes is placed a slide or gage, E, for the purpose of shutting off the grain from the cups, as well as to govern the quantity to be sown. This arrangement is such that corn is dropped the desired uniform distance apart. Other grain may be sown by the same arrangement, and the quantity per acre controlled by the slide-gages E, one of which is withdrawn, showing the seed-cup D in Fig. 1. The portion of the axle containing the seed-cups is inclosed in a cap, F, to which is connected the tube G, Fig. 2. The cap F conveys all the seed as it is discharged from the cups into the tube G, through which it passes into the spout H, thence into the ground.

To the spouts H is attached an adjustable roller, I, for the purpose of covering or rolling in the seed in the spout-groove. Directly in the rear of the seed-spouts is arranged a series of cultivators, K. One set of them is placed a little in advance of the others, as seen in Fig. 3. To these cultivators are connected the rods or draw-bars L, which are hooked to the front end of the machine, and which operate in the ordinary manner.

From the cultivators extend arms, as seen at K', which extend up through the guides M, Fig. 1, so as to allow the cultivators to rise and fall, as the nature of the case may require. The guides M and arms K' act also as braces and supports for the cultivators, to retain them in place and in the inclined or angular position.

The cultivators are connected to the rollers N N' by the straps O, as are also the seed-spouts. The levers P P are likewise connected to the rollers N N' by the straps P'. The jointed adjustable harrow R is connected to the roller N' by the strap O', Fig. 2. From the front end of the harrow extend two drag-bars or rods, R R, to the front end of the frame, by means of which the harrow is drawn upon the ground.

By the action of the levers P P and straps P' P' upon the rollers N N' the seed-spouts, cultivators, and harrow may be raised up from the ground simultaneously, so that they will be suspended by the straps O O'; or it may be so arranged that only the cultivators and harrow Q are raised without the seed-spouts; or it may be so arranged that the cultivators only are raised, as indicated at K, Fig. 2, so that in this case the seed would be sown and harrowed in; or the ground may be cultivated and harrowed by the machine without sowing or planting. The seeding apparatus, cultivators, or harrow may be either used separately or combined, as circumstances may require, by connecting and disconnecting the straps of the seed-spouts, cultivators, and harrow with the rollers N N'. For this purpose a series of holes are placed in the rollers N N', by which any of the straps may be pinned to them, so as to shorten the length of the straps, by which means the rollers will raise and hold up separately either the spouts, cultivators, or harrow, while either of the others or two of them may be upon the ground.

The harrow is made in two sections and connected together by a hinge-joint at S, which allows the harrow to adjust itself to the condition of the ground.

The rollers N N' may be operated independently of each other, so that in case of obstructions or otherwise only that portion of the cultivators connected with one of the rollers need be raised.

I design to place a seat upon the machine in line with the tongue T, and so as to be convenient for the driver to operate the levers P P.

What I claim as my improvement, and which I desire to secure by Letters Patent, is—

The adjustable cultivators K, provided with the arms K′, guides M, and the adjustable jointed harrow Q, when arranged in relation to each other as described, and acting conjointly with the seeding apparatus, in the manner and for the purpose set forth.

JACOB MAIZE.

Witnesses:
  J. W. BARTELL,
  W. J. FOSS.